(12) United States Patent
Yang et al.

(10) Patent No.: US 11,619,318 B2
(45) Date of Patent: Apr. 4, 2023

(54) SWITCH, INDUCTION CONTROL BOX COMPRISING THE SAME, AND INDUCTION FAUCET

(71) Applicant: GUANGZHOU SEAGULL KITCHEN AND BATH PRODUCTS CO., LTD., Guangzhou (CN)

(72) Inventors: Yuan-Hung Yang, New Taipei (CN); Andy Ou, Xinyi (CN); Yongze He, Zhaigang (CN)

(73) Assignee: GUANGZHOU SEAGULL KITCHEN AND BATH PRODUCTS CO., LTD., Guangzhou (CN)

( * ) Notice: Subject to any disclaimer, the term of this patent is extended or adjusted under 35 U.S.C. 154(b) by 92 days.

(21) Appl. No.: 17/363,112

(22) Filed: Jun. 30, 2021

(65) Prior Publication Data
US 2022/0325817 A1 Oct. 13, 2022

(30) Foreign Application Priority Data
Apr. 13, 2021 (CN) .......................... 202110394779.X (51) Int. Cl.
*F16K 31/06* (2006.01)
*E03C 1/04* (2006.01)

(52) U.S. Cl.
CPC ............ *F16K 31/0675* (2013.01); *E03C 1/04* (2013.01); *F16K 31/0603* (2013.01)

(58) Field of Classification Search
CPC ....... F16K 31/075; F16K 31/0603; E03C 1/04
See application file for complete search history.

(56) References Cited

U.S. PATENT DOCUMENTS

| | | | |
|---|---|---|---|
| 6,962,168 B2* | 11/2005 | McDaniel | E03C 1/055 137/624.11 |
| 2007/0256745 A1* | 11/2007 | Chen | E03C 1/055 137/625.41 |
| 2015/0129060 A1* | 5/2015 | Yang | E03C 1/057 137/551 |

* cited by examiner

*Primary Examiner* — Kevin R Barss
(74) *Attorney, Agent, or Firm* — Platinum Intellectual Property PC (57) ABSTRACT

The disclosure discloses a switch configured to switch an on-off state of a liquid flow conduit to a working mode controlled by a mechanical valve when an induction control component is detected not to be in a working state. The disclosure further discloses an induction control box including the switch, and an induction faucet including: a faucet having a automatic switch mode and a manual switch mode; a sensor arranged on the faucet; a solenoid valve arranged on a water output path and connected with the sensor, wherein when the sensor and solenoid valve are in a working state, the faucet supplies water by automatic switch mode; and a switch configured to switch the faucet from the automatic switch mode to manual switch mode when the sensor and/or the solenoid valve are detected not to be in the working state.

11 Claims, 4 Drawing Sheets

SWITCH, INDUCTION CONTROL BOX COMPRISING THE SAME, AND INDUCTION FAUCET

TECHNICAL FIELD

The disclosure relates to the field of conduit valve control. More particularly, the disclosure relates to a switch, an induction control box comprising the switch, and an induction faucet comprising the switch.

BACKGROUND

An induction control box is a control box that is electrically connected to an sensor to realize non-contact induction control, whose main feature is that an induction faucet can automatically supply water to facilitate hand washing when the sensor is obstructed, and the induction control box can be widely used in medical and health institutes, laboratories, hotels, restaurants, kindergartens and other places. Compared with traditional mechanical faucets, the non-contact induction control does not require contact, which can prevent cross-infection, and children can easily operate without mechanical force to adjust a mechanical handle. At present, an infrared sensor control box includes two modes, one mode is that the infrared sensor control box need battery replacement or power supply when there is no power, and the other mode is that a manual mechanical mode is manually switched by rotating a manual switch valve when there is no power. However, the manual switch valve is parallelled in a solenoid valve water circuit, which causes a complex structure of the solenoid valve water circuit, and also needs to add a switch valve that increases the cost.

SUMMARY

An object of the disclosure is to solve at least above problems and/or defects, and to provide, at least, the advantages that will be described later.

An object of the disclosure is to address the disadvantages mentioned in the background that the related infrared induction control box needs to manually rotate the switch valve to switch to the manual mechanical mode. By flipping the switch when it is detected that the battery is about to be discharged (slowly flashing red light), the present disclosure realizes that when the battery is discharged, the simple way of flipping the switch can still be used to quickly switch to the traditional manual mechanical mode. In this way, it is possible to achieve the effect that the induction faucet can also be used as a traditional faucet when it is out of power, avoiding the problem that the induction faucet cannot supply water once no power is supplied.

An another object of the disclosure is to provide a switch.

An another object of the disclosure is to provide an induction control box with the switch.

An another object of the disclosure is to provide an induction faucet with the switch.

Therefore, the technical solutions provided by the disclosure are as follows.

A switch, which is configured to switch an on-off state of a liquid flow conduit to a working mode controlled by a mechanical valve when an induction control component is detected not to be in a working state, wherein the switch and the induction control component are both arranged on the liquid flow conduit with the mechanical valve.

Preferably, the switch further comprises:

a control program, which is respectively connected with the induction control component and the switch, and is configured to determine whether the induction control component is in the working state by detecting whether a sufficient voltage is supplied for the induction control component, wherein when the voltage is detected to be lower than a preset voltage threshold, the control program controls the switch to switch the on-off state of the liquid flow conduit to the working mode controlled by the mechanical valve.

Preferably, the switch further comprises:

an indicator light, which is connected with the control program, and is configured to flash when the induction control component is detected not be in the working state by the control program.

Preferably, in the switch, the control program adopts a three-stage mode for detecting the voltage, wherein the first stage is that a battery supplies a normal working voltage when the voltage of the battery is 4.7-6 V, the second stage is that the battery supplies an insufficient voltage when the voltage of the battery is 4.5-4.7 V, the indicator light being in a prompting mode by slowly flashing red light, and the third stage is that the battery is dead when the voltage of the battery is below 4.5V, the indicator light being in a prompting mode by quickly flashing red light.

Preferably, in the switch, the switch is configured to switch between an automatic switch mode and the manual switch mode.

A induction control box with a switch, which comprises the switch.

An induction faucet with a switch, which comprises:

a faucet, which has a contactless automatic switch mode and a manual switch mode with contacting a mechanical handle;

a sensor, which is arranged on the faucet;

a solenoid valve, which is arranged on a water outlet path of the faucet, and is connected with the sensor, wherein when the sensor and the solenoid valve are in a working state, the faucet supplies water by the automatic switch mode;

a switch, which is configured to switch the faucet from the automatic switch mode to the manual switch mode when the sensor and/or the solenoid valve are detected not to be in the working state.

Preferably, in the induction faucet with a switch, the on-off state of the faucet can be automatically or manually switched by the switch.

Preferably, the induction faucet with a switch further comprises:

a power supply, which is respectively electrically connected to the sensor and the solenoid valve;

a control circuit board, which is connected to the power supply;

a control program, which is respectively connected with the control circuit board, the solenoid valve and the sensor, and is configured to determine whether the solenoid valve and/or the sensor are in the working state by detecting whether a sufficient voltage is supplied for the solenoid valve and/or the sensor by the power supply, wherein when the voltage is lower than a preset voltage threshold, the control program controls the switch to switch the faucet from the automatic switch mode to the manual switch mode.

Preferably, the induction faucet with a switch further comprises:

an indicator light, which is connected with the control program, and is configured to flash when a voltage supplied from the power supply detected by the control program is insufficient to maintain the working state of the solenoid valve and/or the sensor.

Preferably, in the induction faucet with a switch, the control circuit board adopts a three-stage mode for detecting the voltage, wherein the first stage is that a battery supplies a normal working voltage when the voltage of the battery is 4.7-6 V, the second stage is that the battery supplies an insufficient voltage when the voltage of the battery is 4.5-4.7 V, the indicator light being in a prompting mode by slowly flashing red light, and the third stage is that the battery is dead when the voltage of the battery is below 4.5V, the indicator light being in a prompting mode by quickly flashing red light.

Preferably, the induction faucet with a switch further comprises:

an induction control box, wherein the control program, the control circuit board, the switch, the power supply and the indicator light are arranged in the induction control box, the surface of the induction control box is provided with a flexible rubber plug, and the flexible rubber plug is arranged at a position corresponding to the outside of the switch and the indicator light.

Preferably, in the induction faucet with a switch, the faucet comprises:

a faucet body, which comprises a spout and a mechanical handle, wherein the sensor is arranged at a front side of the faucet body, an water inlet end of the faucet body is respectively disposed in fluid communication with a hot water inlet hose and a cold water inlet hose, the hot water inlet hose and the cold water inlet hose are mixed at the mechanical handle to supply mixed water, an water outlet end of the mechanical handle is disposed in fluid communication with the spout through a mixed water outlet conduit, and the solenoid valve is arranged at the mixed water outlet conduit; and when the faucet supplies water in the contactless automatic switch mode, the mechanical handle is in a turning-on state.

Preferably, in the induction faucet with a switch, the mixed water outlet conduit comprises a mixed water outlet hose whose one end is disposed in fluid communication with the water outlet end of the mechanical handle, and a mixed water delivery hose whose one end is disposed in fluid communication with the spout, wherein an input end of the solenoid valve is disposed in fluid communication with the other end of the mixed water outlet hose, and an output end of the solenoid valve is disposed in fluid communication with the other end of the mixed water delivery hose.

Preferably, in the induction faucet with a switch, the sensor is a far-infrared sensor.

The disclosure includes at least the following substantial improvements and beneficial effects.

When it is detected that the induction control component is not in the working state, by flipping the switch, the switch of the disclosure can be quickly switched to the traditional manual mechanical valve mode by a simple way of the switch, eliminating the need for a switch valve and reducing cost.

By flipping the switch when it is detected that the battery is about to be discharged (slowly flashing red light), the present disclosure realizes that when the battery is discharged, the simple way of flipping the switch can still be used to quickly switch to the traditional manual mechanical mode. In this way, it is possible to achieve the effect that the induction faucet can also be used as a traditional faucet when it is out of power, avoiding the problem that the induction faucet cannot supply water once no power is supplied.

Other advantages, objects, and features of the disclosure will be shown in part through the following description, and in part will be understood by those skilled in the art from study and practice of the disclosure.

DETAILED DESCRIPTION

The disclosure will now be described in further detail in connection with the figures, to enable a person skilled in the field to practice in connection with the literal description of the specification.

It should be noted that terms such as "having", "including" and "comprising" as used herein do not exclude presence or addition of one or more other elements or combinations thereof.

The disclosure provides a switch 215, which is configured to switch an on-off state of a liquid flow conduit to a working mode controlled by a mechanical valve when an induction control component is detected not to be in a working state. The switch 215 and the induction control component are both arranged on the liquid flow conduit with the mechanical valve.

When it is detected that the induction control component is not in the working state, by flipping the switch, the switch of the disclosure can be quickly switched to the traditional manual mechanical valve mode by a simple way of the switch, eliminating the need for a switch valve and reducing cost.

In one embodiment of the disclosure, the disclosure detects whether the induction control component is in working state by detecting the change of the power supply voltage for the power supply of the induction control component. Specifically, the switch can further comprise:

a control program, which is respectively connected with the induction control component and the switch 215, and is configured to determine whether the induction control component is in the working state by detecting whether a sufficient voltage is supplied for the induction control component. When the voltage is detected to be lower than a preset voltage threshold, the control program controls the switch to switch the on-off state of the liquid flow conduit to the working mode controlled by the mechanical valve.

For example, the control program is a software program which is stored in a control circuit board in an induction control box.

In one embodiment of the disclosure, the preset voltage threshold is 4.5V.

In one embodiment of the disclosure, the switch can further comprise:

an indicator light 216, which is connected with the control program, and the indicator light 216 may be a LED light. The indicator light 216 is configured to flash when the induction control component is detected not be in the working state by the control program.

Figure 5:
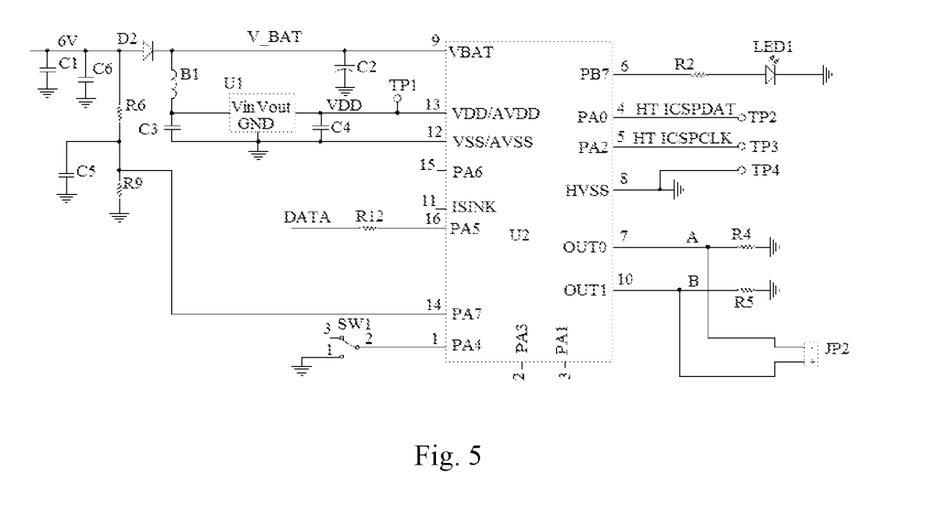
FIG. 5 is a principle diagram of the control circuit board according to one embodiment of the disclosure.

In one embodiment of the disclosure, as shown by a principle diagram of a circuit in FIG. 5, the control program adopts a three-stage mode for detecting the voltage. The first stage is that a battery supplies a normal working voltage when the voltage of the battery is 4.7-6 V, the second stage is that the battery supplies an insufficient voltage when the voltage of the battery is 4.5-4.7 V, the indicator light being in a prompting mode by slowly flashing red light, and the third stage is that the battery is dead when the voltage of the battery is below 4.5V, the indicator light being in a prompting mode by quickly flashing red light.

In one embodiment of the disclosure, the switch 215 is configured to switch between an automatic switch mode and the manual switch mode.

The disclosure also provides an induction control box 200 with the switch. The induction control box 200 comprises the switch 215. A signal line 201 is electrically connected to a sensor 102 and a control circuit board 207; and a power line 202 is electrically connected to the control circuit board 207.

A flexible rubber plug 205 is provided on the surface of the induction control box 200. When the flexible rubber plug 205 is moved, the built-in functional switch 215 can be seen. The functional switch 215 can realize manual or automatic mode switch. When dialed up, it is in manual mode; when dialed down, it is in automatic mode. The manual mode is to completely use the faucet mechanical handle to control the on and off of the water supply, and the automatic mode is to use the infrared induction method to control the on and off of the water supply.

The induction control box 200 comprises the control circuit board 207, whose circuit principle diagram is described in FIG. 5. The control circuit board adopts a three-stage mode for detecting the voltage. The first stage is that a battery supplies a normal working voltage (the voltage of the battery is 4.7-6 V), the second stage is that the battery supplies an insufficient voltage (the voltage of the battery is 4.5-4.7 V, and LED 1 is in a prompting mode by slowly flashing red light), and the third stage is that the battery is dead (the voltage of the battery is below 4.5V, the LED 1 is in another prompting mode by quickly flashing red light). As shown in FIG. 5, an upper end of a resistor R6 is connected to a positive electrode of the battery; the resistors R6 and a resistor R9 form a voltage divider circuit to detect the voltage supplied by the battery, and a detected voltage is sent to a single chip microcomputer U2 for analysis and processing. The comparisons with the voltage thresholds are performed in three stages by the algorithm.

Figure 4:
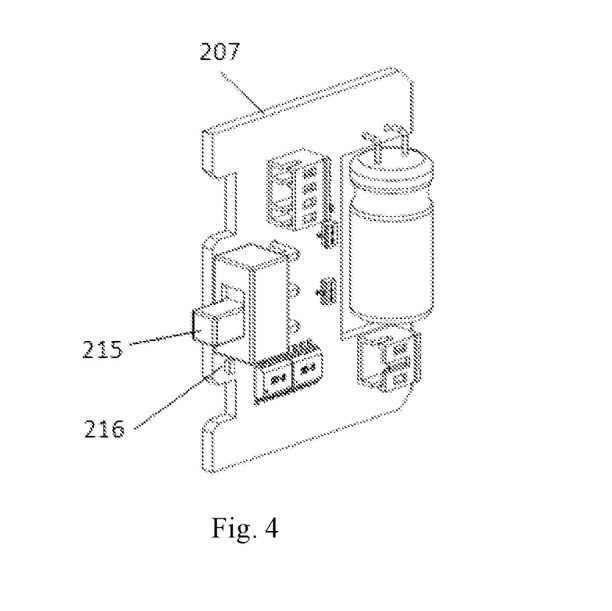
FIG. 4 is a structural diagram of the switch of the induction control box according to one embodiment of the disclosure.

The LED 1 corresponds to the indicator light 216 shown in FIG. 4. The slowly flashing red light is initially set to flash once per second, and the quickly flashing red light is initially set to flash twice per second.

The flexible rubber plug 205 is made of translucent materials, which can not only realize the waterproof function to prevent water from seeping into the shell from the surface of the shell, but also makes it possible to see the inside LED with a state of flashing red light.

The induction control box 200 also comprises a lower cover 209, a hanging board 210, sliding wheels 217, a bending plate 208 that is used to fix a solenoid valve 206, screws 211 used to lock the bending plate 208, screws 213 used to lock the sliding wheels 217, screws 212 used to lock the lower cover 209, and screws 214 used for fixing the hanging board 210. The sliding wheels 217 is used for fixing the induction control box 200 by inserting into an macrohole of the hanging board 210 and pushing sideways.

The sensor 102 is an infrared sensor (may be other sensors), which is electrically connected with the induction control box 200 through a signal line 201.

A battery box 300 can be loaded with four AA batteries 301, which are electrically connected to the induction control box 200 through a power line 202, and used to supply power to the whole machine.

A hook-and-loop fastener 400 has two pieces separated, one piece is attached to a side of the battery box 300, and the other piece is attached to a side of the induction control box 200. After the two pieces are pressed together, the battery box 300 can be fixed on a side of the induction control box 200.

Figure 1:
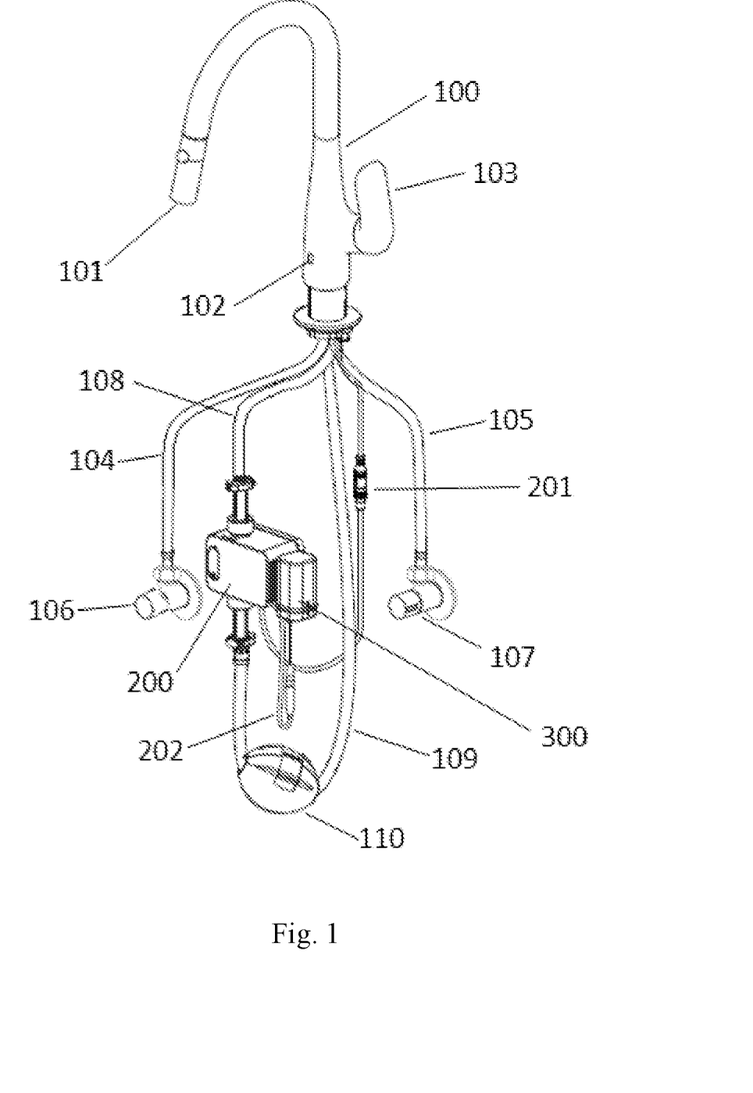
FIG. 1 is a overall structure diagram of the induction faucet with the switch according to one embodiment of the disclosure.
Figure 6:
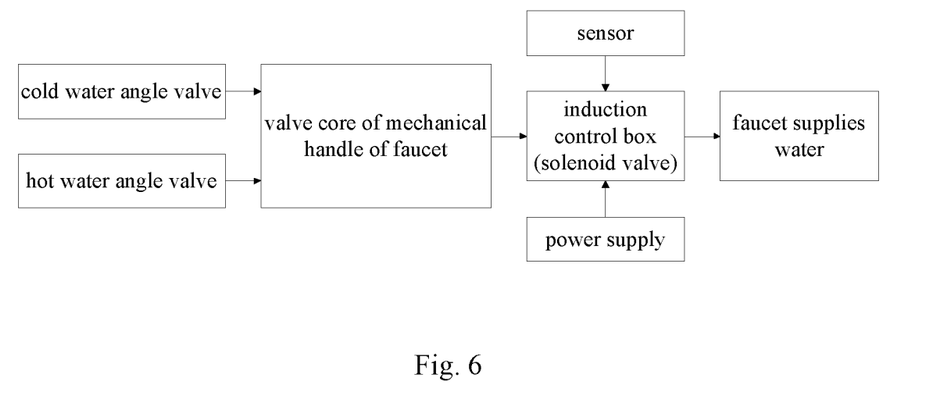
FIG. 6 is a schematic block diagram of an induction control box with the switch according to one embodiment of the disclosure.

As shown in FIG. 1 and FIG. 6, the disclosure provides an induction faucet with a switch, the induction faucet comprising:

a faucet, which has a contactless automatic switch mode and a manual switch mode with contacting a mechanical handle 103;

a sensor 102, which is arranged on the faucet;

a solenoid valve 206, which is arranged on a water outlet path of the faucet, and is connected with the sensor 102, wherein when the sensor 102 and the solenoid valve 206 are in a working state, the faucet supplies water by the automatic switch mode;

a switch 215, which is configured to switch the faucet from the automatic switch mode to the manual switch mode when the sensor 102 and/or the solenoid valve 206 are detected not to be in the working state.

By flipping the switch when it is detected that the battery is about to be discharged (slowly flashing red light), the present disclosure realizes that when the battery is discharged, the simple way of flipping the switch can still be used to quickly switch to the traditional manual mechanical mode. In this way, it is possible to achieve the effect that the induction faucet can also be used as a traditional faucet when it is out of power, avoiding the problem that the induction faucet cannot supply water once no power is supplied.

In one embodiment of the disclosure, the on-off state of the faucet can be automatically or manually switched by the switch 215.

In one embodiment of the disclosure, the induction faucet with a switch further comprises:

a power supply, which is respectively electrically connected to the sensor 102 and the solenoid valve 206;

a control circuit board 207, which is connected to the power supply;

a control program, which is respectively connected with the control circuit board 207, the solenoid valve 206 and the sensor 102, and is configured to determine whether the solenoid valve 206 and/or the sensor 102 are in the working state by detecting whether a sufficient voltage is supplied for the solenoid valve 206 and/or the sensor 102 by the power supply, wherein when the voltage is lower than a preset voltage threshold, the control program controls the switch 215 to switch the faucet from the automatic switch mode to the manual switch mode.

When the sensor receives an induction action, the sensor sends a control command to the control circuit board 207, the control circuit board 207 sends a valve opening signal to open the solenoid valve 206, and the induction faucet supplies water. After washing hands, an user cover the sensor with a hand and the faucet automatically turns off water. When an insufficient voltage is detected, the automatic switch mode is quickly switched to the manual switch mode by flipping the switch 215 to realize that the infrad induction faucet can still be used as traditional faucet when it is out of power, which avoids the problem that the induction faucet cannot supply water when no power is supplied. That is, when there is no electricity, the solenoid valve can be passed through, eliminating the need for a switch valve and reducing cost.

In one embodiment of the disclosure, the induction faucet with a switch further comprises:

an indicator light 216, which is connected with the control program, and is configured to flash when a voltage supplied from the power supply detected by the control program is insufficient to maintain the working state of the solenoid valve 206 and/or the sensor 102.

In the above technical solution, preferably, the control circuit board adopts a three-stage mode for detecting the voltage. The first stage is that a battery supplies a normal working voltage when the voltage of the battery is 4.7-6 V, the second stage is that the battery supplies an insufficient voltage when the voltage of the battery is 4.5-4.7 V, the indicator light 216 being in a prompting mode by slowly flashing red light, and the third stage is that the battery is dead when the voltage of the battery is below 4.5V, the indicator light 216 being in a prompting mode by quickly flashing red light.

Figure 2:
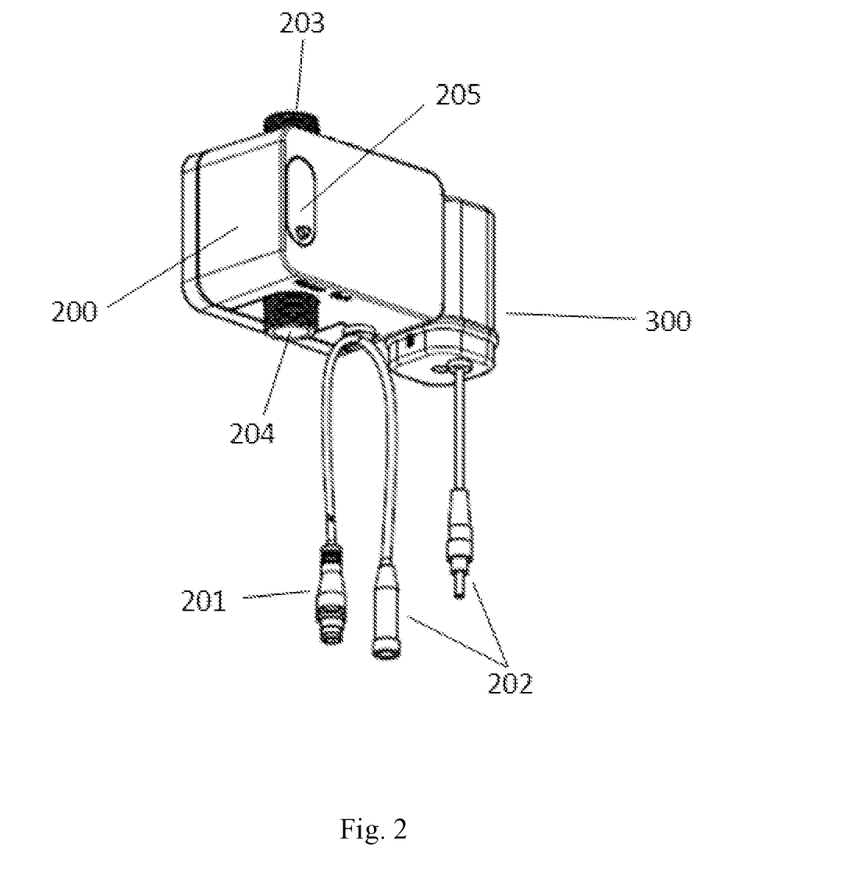
FIG. 2 is a structural diagram of the induction control box according to one embodiment of the disclosure.
Figure 3:
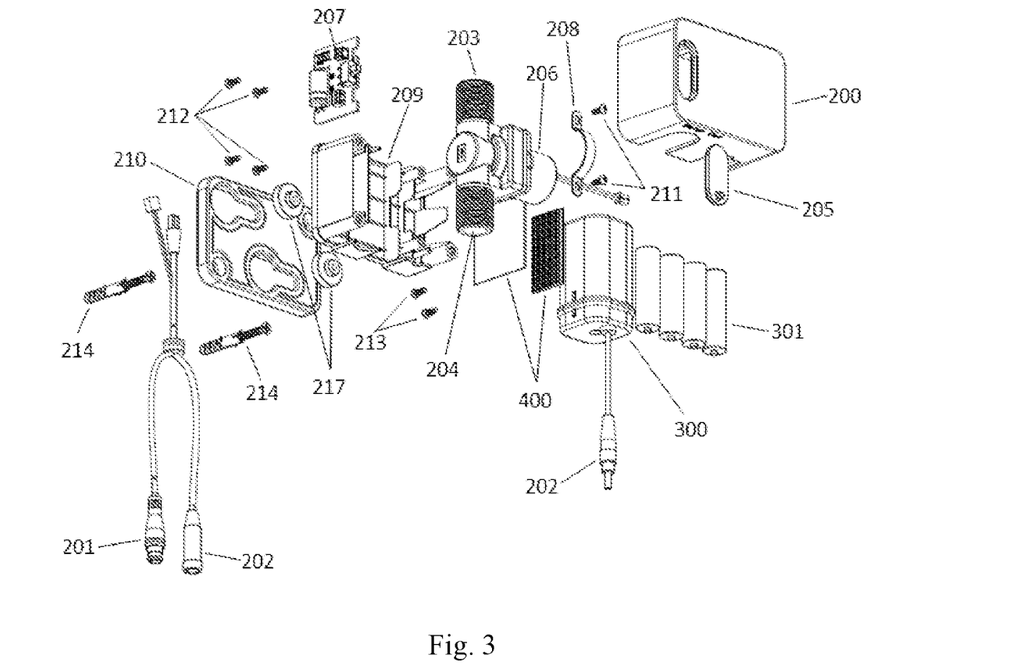
FIG. 3 is a exploded diagram of the induction control box according to one embodiment of the disclosure.

In one embodiment of the disclosure, the induction faucet with a switch further comprises:

as shown in FIG. 2, FIG. 3 and FIG. 4, an induction control box 200. The control program, the control circuit board 207, the switch 215, the power supply and the indicator light 216 are arranged in the induction control box 200, the surface of the induction control box is provided with a flexible rubber plug 205, and the flexible rubber plug 205 is arranged at a position corresponding to the outside of the switch 215 and the indicator light 216.

In one embodiment of the disclosure, the faucet comprises:

a faucet body 100, which comprises a spout 101 and a mechanical handle 103, wherein the sensor 102 is arranged at a front side of the faucet body 100, an water inlet end of the faucet body 100 is respectively disposed in fluid communication with a hot water inlet hose 104 and a cold water inlet hose 105, the hot water inlet hose 104 and the cold water inlet hose 105 are mixed at the mechanical handle 103 to supply mixed water, an water outlet end of the mechanical handle 103 is disposed in fluid communication with the spout 101 through a mixed water outlet conduit, and the solenoid valve 206 is arranged at the mixed water outlet conduit; and when the faucet supplies water in the contactless automatic switch mode, the mechanical handle 103 is in a turning-on state.

In the above technical solution, preferably, the mixed water outlet conduit comprises a mixed water outlet hose 108 whose one end is disposed in fluid communication with the water outlet end of the mechanical handle 103, and a mixed water delivery hose 109 whose one end is disposed in fluid communication with the spout 101, an input end of the solenoid valve 206 is disposed in fluid communication with the other end of the mixed water outlet hose 108, and an output end of the solenoid valve 206 is disposed in fluid communication with the other end of the mixed water delivery hose 109. Therefore, a complete water path is realized.

The induction control box 200 comprises the switch 215. A signal line 201 is electrically connected to a sensor 102 and a control circuit board 207; and a power line 202 is electrically connected to the control circuit board 207.

A flexible rubber plug 205 is provided on the surface of the induction control box 200. When the flexible rubber plug 205 is moved, the built-in functional switch 215 can be seen. The functional switch 215 can realize manual or automatic mode switch. When dialed up, it is in manual mode; when dialed down, it is in automatic mode. The manual mode is to completely use the faucet mechanical handle to control the on and off of the water supply, and the automatic mode is to use the infrared induction method to control the on and off of the water supply.

The induction control box 200 comprises the control circuit board 207, whose circuit principle diagram is described in FIG. 5. The control circuit board adopts a three-stage mode for detecting the voltage. The first stage is that a battery supplies a normal working voltage (the voltage of the battery is 4.7-6 V), the second stage is that the battery supplies an insufficient voltage (the voltage of the battery is 4.5-4.7 V, and LED 1 is in a prompting mode by slowly flashing red light), and the third stage is that the battery is dead (the voltage of the battery is below 4.5V, the LED 1 is in another prompting mode by quickly flashing red light). As shown in FIG. 5, an upper end of a resistor R6 is connected to a positive electrode of the battery; the resistors R6 and a resistor R9 form a voltage divider circuit to detect the voltage supplied by the battery, and a detected voltage is sent to a single chip microcomputer U2 for analysis and processing. The comparisons with the voltage thresholds are performed in three stages by the algorithm.

The LED 1 corresponds to the indicator light 216 shown in FIG. 4. The slowly flashing red light is initially set to flash once per second, and the quickly flashing red light is initially set to flash twice per second.

The flexible rubber plug 205 is made of translucent materials, which can not only realize the waterproof function to prevent water from seeping into the shell from the surface of the shell, but also makes it possible to see the inside LED with a state of flashing red light.

The induction control box 200 also comprises a lower cover 209, a hanging board 210, sliding wheels 217, a bending plate 208 that is used to fix a solenoid valve 206, screws 211 used to lock the bending plate 208, screws 213 used to lock the sliding wheels 217, screws 212 used to lock the lower cover 209, and screws 214 used for fixing the hanging board 210. The sliding wheels 217 is used for fixing the induction control box 200 by inserting into an macrohole of the hanging board 210 and pushing sideways.

The sensor 102 is an infrared sensor (may be other sensors), which is electrically connected with the induction control box 200 through a signal line 201.

A battery box 300 can be loaded with four AA batteries 301, which are electrically connected to the induction control box 200 through a power line 202, and used to supply power to the whole machine.

A hook-and-loop fastener 400 has two pieces separated, one piece is attached to a side of the battery box 300, and the other piece is attached to a side of the induction control box 200. After the two pieces are pressed together, the battery box 300 can be fixed on a side of the induction control box 200.

In one embodiment of the disclosure, the sensor 102 is a far-infrared sensor.

An embodiment will now be described in detail, to enable a person skilled in the field to practice with reference to the literal description of the specification.

As shown in FIG. 1 to FIG. 6, the induction control box 200 and a infrared induction faucet 100 will be hereinafter described.

The induction control box 200 is connected with the infrared induction faucet 100, and mainly realizes automatic induction control of the on-off state of water supply through the sensor 102 arranged on the infrared induction faucet 100. In the figures, a faucet body 100, a spout 101, an infrared sensor 102, a mechanical handle 103 with the switching function and the temperature adjusting function, a hot water inlet hose 104, a cold water inlet hose 105, a hot water inlet angle valve 106, and a cold water inlet angle valve 107 are shown. If the automatic induction water supply function will be used, the mechanical handle 103 must be fully opened firstly. Cold water and hot water pass through corresponding inlet hoses and enter into the mechanical handle 103 to obtain mixed water by adjusting a mixing ratio of cold and hot water. After passing through the mechanical handle 103, the mixed water outlet hose 108 is disposed in fluid communication with the input end 203 of the solenoid valve 206, the output end 204 of the solenoid valve 206 is disposed in fluid communication with the mixed water delivery hose 109, and the mixed water delivery hose 109 is disposed in fluid communication with the spout 101. Therefore, a complete water path is realized.

In the induction control box 200, the signal line 201 is electrically connected to the sensor 102 and the power line 202 is electrically connected to the control circuit board 207.

A flexible rubber plug 205 is provided on the surface of the induction control box 200. When the flexible rubber plug 205 is moved, the built-in functional switch 215 can be seen. The functional switch 215 can realize manual or automatic mode switch. When dialed up, it is in manual mode; when dialed down, it is in automatic mode. The manual mode is to completely use the faucet mechanical handle to control the on and off of the water supply, and the automatic mode is to use the infrared induction method to control the on and off of the water supply (i.e., a automatic mode realized by the solenoid valve 206 and the sensor 102).

The induction control box 200 comprises the control circuit board 207, whose circuit principle diagram is described in FIG. 5. The control circuit board adopts a three-stage mode for detecting the voltage. The first stage is that a battery supplies a normal working voltage (the voltage of the battery is 4.7-6 V), the second stage is that the battery supplies an insufficient voltage (the voltage of the battery is 4.5-4.7 V, and LED 1 is in a prompting mode by slowly flashing red light), and the third stage is that the battery is dead (the voltage of the battery is below 4.5V, the LED 1 is in another prompting mode by quickly flashing red light). As shown in FIG. 5, an upper end of a resistor R6 is connected to a positive electrode of the battery; the resistors R6 and a resistor R9 form a voltage divider circuit to detect the voltage supplied by the battery, and a detected voltage is sent to a single chip microcomputer U2 for analysis and processing. The comparations with the voltage thresholds are performed in three stages by the algorithm.

The LED 1 corresponds to the indicator light 216 shown in FIG. 4. The slowly flashing red light is initially set to flash once per second, and the quickly flashing red light is initially set to flash twice per second.

The flexible rubber plug 205 is made of translucent materials, which can not only realize the waterproof function to prevent water from seeping into the shell from the surface of the shell, but also makes it possible to see the inside LED with a state of flashing red light.

The induction control box 200 also comprises a lower cover 209, a hanging board 210, sliding wheels 217, a bending plate 208 that is used to fix a solenoid valve 206, screws 211 used to lock the bending plate 208, screws 213 used to lock the sliding wheels 217, screws 212 used to lock the lower cover 209, and screws 214 used for fixing the hanging board 210. The sliding wheels 217 is used for fixing the induction control box 200 by inserting into an macrohole of the hanging board 210 and pushing sideways.

The sensor 102 is an infrared sensor (may be other sensors), which is electrically connected with the induction control box 200 through a signal line 201.

A battery box 300 can be loaded with four AA batteries 301, which are electrically connected to the induction control box 200 through a power line 202, and used to supply power to the whole machine.

A hook-and-loop fastener 400 has two pieces separated, one piece is attached to a side of the battery box 300, and the other piece is attached to a side of the induction control box 200. After the two pieces are pressed together, the battery box 300 can be fixed on a side of the induction control box 200.

The induction control box 200 of the disclosure comprising the switch for switching between manual switch mode/automatic switch mode is used to control the on-off state of the faucet. The induction control box 200 may adopt a three-stage mode for detecting the voltage, and may slowly flash red light or quickly flash red light. The battery box can be fixed on a side of the induction control box by a hook-and-loop fastener. The induction control box may be fixed by the hanging board.

The number of devices and processing scale described here are used to simplify the description of the disclosure. The application, modification and changes of switch, induction control box comprising the same, and induction faucet of the disclosure will be obvious to those skilled in the art.

Although the embodiments of the disclosure have been disclosed above, they are not limited to the applications previously mentioned in the specification and embodiments and can be applied in various fields suitable for the disclosure. For an ordinary skilled person in the field, other changes may be easily achieved. Therefore, without departing the general concept defined by the claims and their equivalents, the disclosure is not limited to particular details and embodiments shown and described herein.

What is claimed is:

1. A switch, which is configured to switch an on-off state of a liquid flow conduit to a working mode controlled by a mechanical valve when an induction control component is detected not to be in a working state, wherein the switch and the induction control component are both arranged on the liquid flow conduit with the mechanical valve;

wherein the switch further comprises:
a control program, which is respectively connected with the induction control component and the switch, and is configured to determine whether the induction control component is in the working state by detecting whether a sufficient voltage is supplied for the induction control component, wherein when the voltage is detected to be lower than a preset voltage threshold, the control program controls the switch to switch the on-off state of the liquid flow conduit to the working mode controlled by the mechanical valve;

an indicator light, which is connected with the control program, and is configured to flash when the induction control component is detected not be in the working state by the control program;

wherein the control program adopts a three-stage mode for detecting the voltage, wherein the first stage is that a battery supplies a normal working voltage when the voltage of the battery is 4.7-6 V, the second stage is that the battery supplies an insufficient voltage when the voltage of the battery is 4.5-4.7 V, the indicator light being in a prompting mode by slowly flashing red light, and the third stage is that the battery is dead when the voltage of the battery is below 4.5V, the indicator light being in a prompting mode by quickly flashing red light.

2. The switch according to claim 1, wherein the switch is configured to switch between an automatic switch mode and the manual switch mode.

3. A induction control box with a switch, which comprises the switch according to claim 1.

4. An induction faucet with a switch, which comprises:
a faucet, which has a contactless automatic switch mode and a manual switch mode with contacting a mechanical handle;
a sensor, which is arranged on the faucet;
a solenoid valve, which is arranged on a water outlet path of the faucet, and is connected with the sensor, wherein when the sensor and the solenoid valve are in a working state, the faucet supplies water by the automatic switch mode;
a switch, which is configured to switch the faucet from the automatic switch mode to the manual switch mode when the sensor and/or the solenoid valve are detected not to be in the working state;
a power supply, which is respectively electrically connected to the sensor and the solenoid valve;
a control circuit board, which is connected to the power supply;
a control program, which is respectively connected with the control circuit board, the solenoid valve and the sensor, and is configured to determine whether the solenoid valve and/or the sensor are in the working state by detecting whether a sufficient voltage is supplied for the solenoid valve and/or the sensor by the power supply, wherein when the voltage is lower than a preset voltage threshold, the control program controls the switch to switch the faucet from the automatic switch mode to the manual switch mode.

5. The induction faucet with a switch according to claim 4, wherein the on-off state of the faucet can be automatically or manually switched by the switch.

6. The induction faucet with a switch according to claim 4, wherein the faucet comprises:
a faucet body, which comprises a spout and a mechanical handle, wherein the sensor is arranged at a front side of the faucet body, an water inlet end of the faucet body is respectively disposed in fluid communication with a hot water inlet hose and a cold water inlet hose, the hot water inlet hose and the cold water inlet hose are mixed at the mechanical handle to supply mixed water, an water outlet end of the mechanical handle is disposed in fluid communication with the spout through a mixed water outlet conduit, and the solenoid valve is arranged at the mixed water outlet conduit; and
when the faucet supplies water in the contactless automatic switch mode, the mechanical handle is in a turning-on state.

7. The induction faucet with a switch according to claim 6, wherein the mixed water outlet conduit comprises a mixed water outlet hose whose one end is disposed in fluid communication with the water outlet end of the mechanical handle, and a mixed water delivery hose whose one end is disposed in fluid communication with the spout, wherein an input end of the solenoid valve is disposed in fluid communication with the other end of the mixed water outlet hose, and an output end of the solenoid valve is disposed in fluid communication with the other end of the mixed water delivery hose.

8. The induction faucet with a switch according to claim 4, wherein the sensor is a far-infrared sensor.

9. The induction faucet with a switch according to claim 4, further comprising:
an indicator light, which is connected with the control program, and is configured to flash when a voltage supplied from the power supply detected by the control program is insufficient to maintain the working state of the solenoid valve and/or the sensor.

10. The induction faucet with a switch according to claim 9, wherein the control circuit board adopts a three-stage mode for detecting the voltage, wherein the first stage is that a battery supplies a normal working voltage when the voltage of the battery is 4.7-6 V, the second stage is that the battery supplies an insufficient voltage when the voltage of the battery is 4.5-4.7 V, the indicator light being in a prompting mode by slowly flashing red light, and the third stage is that the battery is dead when the voltage of the battery is below 4.5V, the indicator light being in a prompting mode by quickly flashing red light.

11. The induction faucet with a switch according to claim 4, further comprising:
an induction control box, wherein the control program, the control circuit board, the switch, the power supply and the indicator light are arranged in the induction control box, the surface of the induction control box is provided with a flexible rubber plug, and the flexible rubber plug is arranged at a position corresponding to the outside of the switch and the indicator light.

* * * * *